United States Patent [19]

Heilgeist

[11] 4,439,326

[45] Mar. 27, 1984

[54] PROCESS FOR REMOVING AMMONIUM NITRATE FROM AQUEOUS SOLUTIONS

[75] Inventor: Michael Heilgeist, Linkenheim, Fed. Rep. of Germany

[73] Assignee: Kernforschungszentrum Karlsruhe GmbH, Karlsruhe, Fed. Rep. of Germany

[21] Appl. No.: 328,667

[22] Filed: Dec. 8, 1981

[30] Foreign Application Priority Data

Dec. 19, 1980 [DE] Fed. Rep. of Germany ....... 3048002

[51] Int. Cl.$^3$ ................................................ G21F 9/06
[52] U.S. Cl. .................................... 210/757; 210/903; 252/631; 423/396; 423/351
[58] Field of Search ....................... 252/626, 631, 193; 210/903, 757; 423/396, 375, 403, 405, 351

[56] References Cited

U.S. PATENT DOCUMENTS

| 2,838,368 | 6/1958 | Boyer et al. | 252/631 |
| 2,854,315 | 9/1958 | Alter et al. | 252/626 |
| 3,411,883 | 11/1968 | Van Rouendal Smit | 252/631 |
| 3,579,298 | 5/1971 | O'Brien et al. | 423/403 |
| 3,649,179 | 3/1972 | Ikeda et al. | 423/396 |
| 3,673,086 | 6/1972 | Drobnik | 252/631 |
| 3,862,296 | 1/1975 | Dotson et al. | 252/629 |

FOREIGN PATENT DOCUMENTS

| 2449588 | 4/1976 | Fed. Rep. of Germany | 252/631 |
| 2938654 | 9/1980 | Fed. Rep. of Germany | 252/626 |
| 55-24514 | 2/1980 | Japan | 210/757 |

OTHER PUBLICATIONS

Gmelins Handbuch der Anorganischen Chemie, in Translation, Gmelins Handbook of Inorganic Chemistry, vol. Nitrogen, System No. 4, 1936, pp. 803 to 811.
Gmelins Handbuch der Anorganischen Chemie, in Translation, Gmelins Handbook of Inorganic Chemistry, vol. Ammonia, System No. 23, 1936, pp. 84 to 93, 112 to 115 and 128 to 130.
Jacobson, C. 1953, Encyclopedia of Chemical Reactions, Reinhold Publishing Company, New York, pp. 171-176.

*Primary Examiner*—Deborah L. Kyle
*Assistant Examiner*—Howard J. Locker
*Attorney, Agent, or Firm*—Spencer & Frank

[57] ABSTRACT

A process for removing ammonium nitrate $NH_4NO_3$ (AN) from an aqueous solution. At least one nitrogen-oxygen (N-O) compound in the form of $NO_x$ and/or $N_2O_{2x}$, where $x=1$ or 2, is added to the aqueous solution containing the AN, the N-O compound being in gaseous or liquid state or as an ion present in an aqueous solution, at a temperature above room temperature but below the boiling point of the solution containing the AN and under normal pressure.

5 Claims, No Drawings

PROCESS FOR REMOVING AMMONIUM NITRATE FROM AQUEOUS SOLUTIONS

BACKGROUND OF THE INVENTION

The present invention relates to a process for removing ammonium nitrate $NH_4NO_3$ from aqueous solutions.

Ammonium nitrate, $NH_4NO_3$ (hereinafter referred to as AN) is obtained as a byproduct, for example, in reprocessing processes for irradiated nuclear fuels and/or breeder elements such as, for example, in the Purex process, and is undesirable during further industrial processing of the process solutions in which it is contained. In the production of $UO_2$ according to the ammonium uranyl carbonate precipitation process (AUC), or in the joint precipitation process of uranium and plutonium according to the ammonium uranyl plutonyl carbonate process (AUPuC), AN is obtained as a waste product. In both cases, the AN must be removed. No solution yet exists to the problem of eliminating the undesired products in the Purex process. Several processes have been proposed for the removal of AN in the AUC and AUPuC processes, but none of them constitutes a satisfactory solution.

In one prior art process, as set forth in German Offenlegungsschrift No. 2617968 in the name of P. Morschl and E. Zimmer, a basic metal oxide or metal hydroxide is added to the solution containing the AN and the solution is heated to about 100° C. so as to obtain ammonia. The resulting ammonia is separated from the likewise formed metal nitrate by evaporation. Thereafter, the thus formed nitrate solution is dried and the metal nitrate is thermally decomposed to metal oxide and nitric oxides whereupon the nitric oxides are further processed to nitric acid.

In a proposal by F. Herrmann and Th. Sondermann, as set forth in German Auslegeschrift No. 2,838,007, $NH_4+$ ions are separated electrophoretically from the $NO_3-$ ions, and $NH_3$ is extracted by increasing the temperature. The $NO_3-$ ions are extracted for recycling in the form of $HNO_3$.

According to a further process of Th. Sondermann, as set forth in German Offenlegungsschrift No. 2,901,067, for processing AN containing radioactive filtrates, as they are obtained, for example, in the AUC process or in the AUPuC process, the solution is brought to the boiling temperature with the aid of the current heat of an electrolysis current and is denitrated electrolytically. This results in free $NH_3$ and $CO_2$. Additionally, it has been proposed to thermally spray decompose AN containing solutions and to decompose AN with concentrated nitric acid in the presence of chlorides.

All these processes have in common that they have not yet been used industrially or under nuclear plant conditions. The thermal decomposition processes have the grave drawback that they require temperatures above 100° C., that the necessary equipment is complicated with respect to material and space requirements, and that nitrous gases $NO_x$ develop.

The decomposition process with concentrated nitric acid and chlorides brings about serious corrosion problems due to the presence of the chlorides. The electrolytic processes also require complicated equipment, involve a large consumption of electrical energy and encounter anode corrosion problems.

SUMMARY OF THE INVENTION

It is therefore an object of the present invention to provide a process for removing AN which avoids the drawbacks of the prior art processes.

A further object of the present invention is to provide such a process which permits simple and safe implementation as required particularly in nuclear energy plants with simple and robust equipment, and does not produce undesirable reaction products, such as, for example, $NH_3$ or $NO_x$, as waste gases which must be extracted.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for removing ammonium nitrate (AN) from aqueous solutions by adding at least one nitrogen-oxygen compound which is a nitrous oxide of the form $NO_x$ and/or $N_2O_{2x}$, where $x = 1$ or 2, to the AN containing aqueous solution, the nitrogen-oxygen compound being in the gaseous or liquid state, at a temperature above room temperature but below the boiling point of the solution containing the AN, at normal pressure.

It is understood that both the foregoing general description and the following detailed description are exemplary, but are not restrictive of the invention.

DETAILED DESCRIPTION OF THE INVENTION

In the process of the present invention at least one nitrogen-oxygen (N-O) compound of the form $NO_x$ and/or $N_2O_{2x}$ where $x$ is equal to 1 or 2 is added to an AN containing aqueous solution. The nitrogen-oxygen compound preferably is NO, $NO_2$, or $N_2O_4$. The NO and $NO_2$ generally are employed as gases, the $N_2O_4$ generally is employed as a liquid (generally in pure form without other compounds).

According to the present invention, the nitrogen-oxygen compound generally is introduced into the aqueous, AN containing solution in a quantity which corresponds to a Mol ratio of N-O compound to AN in a range between 1 Mol N-O compound to 1 Mol AN to 4 Mol N-O compound to 1 Mol AN. Preferably, the temperature of the solution containing the AN is kept in a range between 50° C. and 100° C. during the reaction with the N-O compound.

In the process according to the present invention, the introduction of gaseous NO or $NO_2$, or liquid $N_2O_4$, into the AN containing solution causes the intermediary formation of ammonium nitrite ($NH_4NO_2$) or results in the joint occurrence of ammonium ions and $HNO_2$ in the solution, respectively, whereupon decomposition takes place according to the equation $$NH_4NO_2 = N_2 + 2H_2O.$$

The process according to the present invention can also be implemented without difficulty with AN containing solutions which are 1 molar nitric acid, i.e. lie in a pH range from 0 to 7.

The advantages of the process according to the present invention reside in the fact that the decomposition of AN can be performed at temperatures below the boiling point of the AN containing solution, preferably even below 100° C., and in the fact that practically the only decomposition products are nitrogen, some laughing gas which is formed in an ancillary reaction, and water.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

In a vertically arranged tubular reactor of simple design, equipped with a thermostatic jacket and filled with Raschig rings, 200 ml of an AN containing aqueous solution were introduced. The nitrogen-oxygen compound then was introduced into the reactor from the bottom. The mode of operation with respect to reaction time, dosaging rate of the nitrogen-oxygen compound, with respect to the reactor vessel or the type of reactor, and with respect to the temperature employed were not optimized, that is, no attempt was made to find the set of conditions which would produce optimum results.

The AN containing solution was a 1 molar nitric acid and 0.8 molar $NH_4NO_3$ solution. During the course of 5 hours, 20 ml of an 8 molar $NaNO_2$ solution were added in measured (incremental) quantities to the AN containing solution. Three different experiments were run, with different temperatures being employed in each experiment. The reaction is dependent of temperature, and therefore the conversion increased with increasing temperature. The time sequence of the $NH_4+$ concentration in each of the experiments can be seen in the following table:

| Exp. No. | T (°C.) | \multicolumn{6}{c}{t (h)} | |
|---|---|---|---|---|---|---|---|
| | | 0 | 1 | 2 | 3 | 4 | 5 | |
| 1 | 50 | 0.8 | 0.76 | 0.73 | 0.68 | 0.63 | 0.57 | Mol/l $NH_4+$ |
| 2 | 70 | 0.8 | 0.71 | 0.66 | 0.54 | 0.46 | 0.37 | Mol/l $NH_4+$ |
| 3 | 90 | 0.8 | 0.70 | 0.58 | 0.46 | 0.33 | 0.22 | Mol/l $NH_4+$ |

The mol ratio in $NO_2-$ to $NH_4+$ was 1:1 after the test was completed. The residual concentrations of AN present after a reaction period of 5 hours corresponded to a coversion of 29% (at 50° C.), 54% (at 70° C.) and 73% (at 90° C.).

EXAMPLE 2

(a) The same quantity, that is, 200 ml, of the same AN containing solution (hereafter referred to as electrolyte) was used as that described in Example 1. During the course of 5 hours, 0.17 Mol gaseous $NO_2$ were introduced into the electrolyte. The time sequence of the $NH_4+$ concentration again exhibited a practically continuous decrease in the course of the experiment, as can be seen in the following table:

| T (°C.) | \multicolumn{6}{c}{t (h)} | |
|---|---|---|---|---|---|---|
| | 0 | 1 | 2 | 3 | 4 | 5 | |
| 90 | 0.8 | 0.78 | 0.72 | 0.65 | 0.58 | 0.55 | Mol/l $NH_4+$ |

The Mol ratio $NO_2$ to $NH_4+$ at the end of the experiment was 1.1:1. In this case, a conversion of 31% was obtained. The process conditions during the experiment were not optimized.

(b) 200 ml of an 0.83 molar $NH_4NO_3$ solution were used as the AN containing solution. During the course of 5 hours, 0.17 Mol gaseous $NO_2$ were introduced into the $NH_4NO_3$ solution. The temperature of the $NH_4NO_3$ solution was kept at 90° C. The decrease of the AN concentration in dependence on time is shown in the following table:

| T (°C.) | \multicolumn{6}{c}{t (h)} | |
|---|---|---|---|---|---|---|
| | 0 | 1 | 2 | 3 | 4 | 5 | |
| 90 | 0.83 | 0.75 | 0.66 | 0.60 | 0.54 | 0.53 | Mol/l $NH_4+$ |

The Mol ratio $NO_2$ to $NH_4+$ here again was 1.1:1 at the end of the experiment. A conversion of AN at a rate of 36% was obtained.

(c) 200 ml of an 1.8 molar $NH_4NO_3$ solution were used as the AN containing solution (electrolyte). During the course of 6 hours, 0.82 Mol gaseous $NO_2$ were introduced into the $NH_4NO_3$ solution. The temperature of the AN containing solution was maintained at 90° C. The concentration of AN dropped from 1.8 Mol per liter to 0.57 Mol per liter, corresponding to a conversion of 69%. The time sequence of the $NH_4+$ concentration is shown in the following table:

| T (°C.) | \multicolumn{7}{c}{t (h)} | |
|---|---|---|---|---|---|---|---|
| | 0 | 1 | 2 | 3 | 4 | 5 | 6 | |
| 90 | 1.82 | 1.78 | 1.64 | 1.45 | 1.33 | 0.92 | 0.57 | Mol/l $NH_4+$ |

The Mol ratio of $NO_2$: $NH_4+$ at the end of the experiment was 2.3:1.

The reaction product in the exhaust gas was found to be nitrogen. The rate of $N_2$ formation corresponded to the AN conversion.

EXAMPLE 3

200 ml of the same AN containing solution (electrolyte) as described in Example 1 were used as the AN containing solution. Two experiments were conducted, one at 70° C. and one at 90° C. During the course of 6 hours, 0.4 Mol (90° C.) and 0.5 Mol (70° C.) gaseous NO was introduced into the electrolyte. During the reaction period, the AN concentration decreased from 0.8 Mol per liter to 0.36 Mol per liter at 70° C., or 0.095 Mol per liter at 90° C., corresponding to a conversion of 55% (at 70° C.) or 88% (at 90° C.). At 70° C., $N_2$ and $N_2O$ were found to be present as reaction products in the exhaust gas. The time sequence of the $NH_4+$ concentration can be seen from the following table.

| T (°C.) | \multicolumn{7}{c}{t (h)} | |
|---|---|---|---|---|---|---|---|
| | 0 | 1 | 2 | 3 | 4 | 5 | 6 | |
| 70 | 0.80 | 0.72 | 0.66 | 0.59 | 0.49 | 0.40 | 0.36 | Mol/l $NH_4+$ |
| 90 | 0.80 | 0.64 | 0.51 | 0.35 | 0.24 | 0.12 | 0.095 | Mol/l $NH_4+$ |

At the end of the test, the Mol ratio of NO to $NH_4+$ was 2.5 to 3.1:1 (2.5:1 for the 90° C. experiment and 3.1:1 for the 70° C. experiment).

It will be understood that the above description of the present invention will be susceptible to various modifications, changes, and adaptations, and the same are intended to be comprehended within the meaning and range of equivalents of the appended claims.

I claim:

1. Process for removing ammonium nitrate of $NH_4NO_3$ (AN) from an aqueous solution, comprising adding at least one nitrogen-oxygen (N-O) compound which is a nitrous oxide in the form of NO, $NO_2$ or $N_2O_4$, to the aqueous solution containing the AN, the N-O compound being in gaseous or liquid state, at a temperature above room temperature but below the boiling point of the solution containing the AN and under normal pressure.

2. Method as defined in claim 1, wherein the nitrogen-oxygen compound is introduced into the aqueous AN containing solution in a quantity which corresponds to a Mol ratio of N-O compound to AN in a range between 1 Mol N-O compound to 1 Mol AN to 4 Mol N-O to 1 Mol AN.

3. Process as defined in claim 1, wherein during the reaction with the N-O compound, the temperature of the solution containing the AN is maintained in a range between 50° C. and 100° C.

4. Process as defined in claim 3, wherein the temperature of the solution containing the AN is maintained in a range between 50° C. and 90° C.

5. Process as defined in claim 1, wherein during the reaction with NO compound, the temperature of the solution containing the AN is maintained in a range between 70° and 90° C.

* * * * *